(12) United States Patent
Teague et al.

(10) Patent No.: US 7,636,328 B2
(45) Date of Patent: Dec. 22, 2009

(54) EFFICIENT TRANSMISSION OF SIGNALING USING CHANNEL CONSTRAINTS

(75) Inventors: Edward Harrison Teague, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 665 days.

(21) Appl. No.: 10/969,117

(22) Filed: Oct. 20, 2004

(65) Prior Publication Data

US 2006/0083183 A1    Apr. 20, 2006

(51) Int. Cl.
H04B 7/00 (2006.01)
H04B 7/005 (2006.01)
H04L 12/28 (2006.01)
H04L 12/56 (2006.01)

(52) U.S. Cl. .................. 370/277; 370/278; 370/279; 370/280; 370/329; 370/408

(58) Field of Classification Search ............ 370/277, 370/278, 279, 280, 329, 408
See application file for complete search history.

(56) References Cited

U.S. PATENT DOCUMENTS

| | | | | |
|---|---|---|---|---|
| 6,091,777 | A * | 7/2000 | Guetz et al. | 375/240.11 |
| 6,909,702 | B2 * | 6/2005 | Leung et al. | 370/278 |
| 7,039,092 | B1 * | 5/2006 | Cao et al. | 375/140 |
| 7,298,718 | B2 * | 11/2007 | Odenwalder et al. | 370/329 |
| 7,385,978 | B1 * | 6/2008 | Yang et al. | 370/390 |
| 2002/0154610 | A1 | 10/2002 | Tiedemann et al. | |
| 2007/0258466 | A1 * | 11/2007 | Kakani | 370/395.53 |

FOREIGN PATENT DOCUMENTS

KR    2002-0011136    2/2002

(Continued)

OTHER PUBLICATIONS

Rouskas et al., "OVSF codes assignment and reassignment at the forward link of W-CDMA 3G Systems," Personal, Indoor and Mobile Radio Communications, 2002, The 13th IEEE International Symposium on Sep. 15-18, 2002 vol. 5, pp. 2404-2408 XP-10614159A.

(Continued)

*Primary Examiner*—Chi H Pham
*Assistant Examiner*—Farah Faroul
(74) *Attorney, Agent, or Firm*—Sandip S. Minhas; Donald C. Kordich

(57) ABSTRACT

To transmit signaling, a base station obtains signaling for a group of channels used for data transmission and selected from a set of channels having constraints on usage. The base station compresses the signaling based on the channel constraints and obtains at least one message. If multiple messages are to be sent, then the assigned channels are partitioned into multiple subgroups, and the signaling for the channels in each subgroup is compressed to obtain a message for that subgroup. Each message is encoded at a spectral efficiency and transmitted at a power level selected for the message. A Cyclic Redundancy Check (CRC) value is appended to the message(s) for error detection. To receive the signaling, a terminal checks a received message with the appended CRC, decodes the message if the CRC passes, decompresses the decoded message based on the channel constraints, and extracts the signaling for an assigned channel.

57 Claims, 12 Drawing Sheets

FOREIGN PATENT DOCUMENTS

| | | |
|---|---|---|
| KR | 2002-0050114 | 6/2002 |
| KR | 2004-0015196 | 2/2004 |

OTHER PUBLICATIONS

International Search Report, PCT/US2005/038107 - International Search Authority - European Patent Office, Feb. 21, 2006.

International Preliminary Report on Patentabiiity, PCT/US2005/038107 - The International Bureau of WIPO - Geneva, Switzerland, Apr. 24, 2007.

Written Opinion, PCT/US2005/038107 - International Search Authority - European Patent Office, Feb. 21, 2006.

* cited by examiner

EFFICIENT TRANSMISSION OF SIGNALING USING CHANNEL CONSTRAINTS

BACKGROUND

I. Field

The present invention relates generally to communication, and more specifically to techniques for transmitting signaling in a communication system.

II. Background

Communication systems are widely deployed to provide various communication services such as voice, packet data, and so on. These systems may be multiple-access systems capable of supporting communication with multiple users simultaneously by sharing the available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

A communication system may employ a transmission scheme with feedback to improve reliability for data transmission. For example, a transmitter may transmit a data packet to a receiver, which may send back an acknowledgment (ACK) if the packet is decoded correctly or a negative acknowledgment (NAK) if the packet is decoded in error. The transmitter uses the ACK feedback from the receiver to terminate the transmission of the decoded packet and uses the NAK feedback to retransmit all or a portion of the data packet. The transmitter is thus able to transmit just enough data for each packet based on the feedback from the receiver.

A base station in a multiple-access system may concurrently communicate with multiple terminals on the forward and reverse links at any given moment. The forward link (or downlink) refers to the communication link from the base stations to the terminals, and the reverse link (or uplink) refers to the communication link from the terminals to the base stations. The base station may receive data transmissions from multiple terminals simultaneously on the reverse link and may need to send multiple ACKs/NAKs in each time interval (e.g., each slot or frame) to these terminals. The base station may send the ACKs/NAKs to each individual terminal using unicast transmission. The ACKs/NAKs may be mapped to identifiers (IDs) assigned to the terminals, and each terminal can recover its ACKs/NAKs based on the terminal ID. Individual ACK/NAK transmissions for a large number of terminals may require an excessive amount of system resources, which is undesirable.

There is therefore a need in the art for techniques to more efficiently transmit ACKs/NAKs in a communication system.

SUMMARY

Techniques for efficiently transmitting signaling (e.g., ACKs/NAKs) in a communication system are described herein. A set of channels is defined for the available system resources (e.g., frequency subbands) based on a channel tree or some other structure, as described below. These channels have certain constraints on usage such that the use of a given channel excludes the use of one or more other channels, as described below.

To transmit signaling, a base station initially obtains signaling (e.g., ACKs/NAKs) for a group of channels that has been assigned for use. The base station compresses the signaling based on the channel constraints and obtains at least one message for the signaling. If multiple messages are to be sent (e.g., to terminals with different channel conditions), then the assigned channels are partitioned into multiple subgroups, and the signaling for the channels in each subgroup is compressed based on the channel constraints to obtain a message for that subgroup. Several exemplary compression schemes based on channel constraints are described below. Each message may be encoded and modulated based on a spectral efficiency or code rate selected for that message and transmitted at a power level selected for the message. A cyclic redundancy check (CRC) value is generated and appended to the message(s) and used for error detection.

To receive the signaling, a terminal receives a transmitted message containing signaling for an assigned channel, checks the received message with the appended CRC, decodes the message if the CRC passes, decompresses the decoded message based on the channel constraints, and extracts the signaling for its assigned channel. The terminal provides a default signaling value (e.g., a NAK) if the CRC fails.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
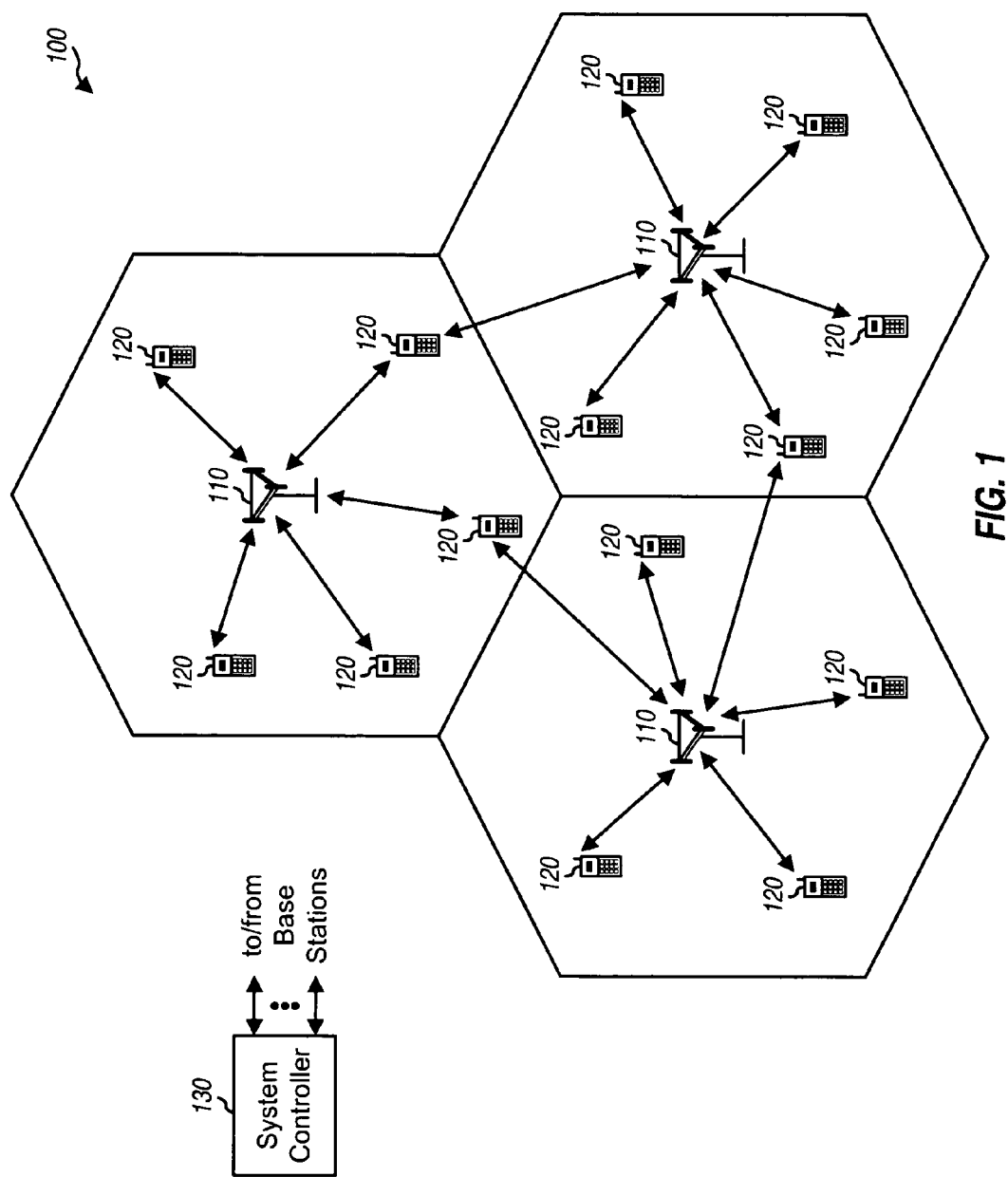
FIG. 1 shows a wireless communication system.

FIG. 1 shows a wireless communication system 100 with a number of base stations 110 that support communication for a number of wireless terminals 120. A base station is a fixed station used for communicating with the terminals and may also be called an access point, a base transceiver station (BTS), a Node B, or some other terminology. A terminal may be fixed or mobile and may also be called a mobile station (MS), a mobile equipment (ME), a user equipment (UE), a wireless device, a subscriber unit, or some other terminology. The terminals may be dispersed throughout the system. Each base station may communicate with any number of terminals at any given moment depending on various factors such as, for example, the number of terminals within the coverage of the base station, the available system resources, the data requirements of the terminals, and so on. A system controller 130 provides coordination and control for the base stations.

The signaling transmission techniques described herein may be used to send various types of signaling such as ACKs/NAKs (i.e., ACK information), power control commands, and so on. For clarity, these techniques are describing for sending ACK information.

Figure 2:
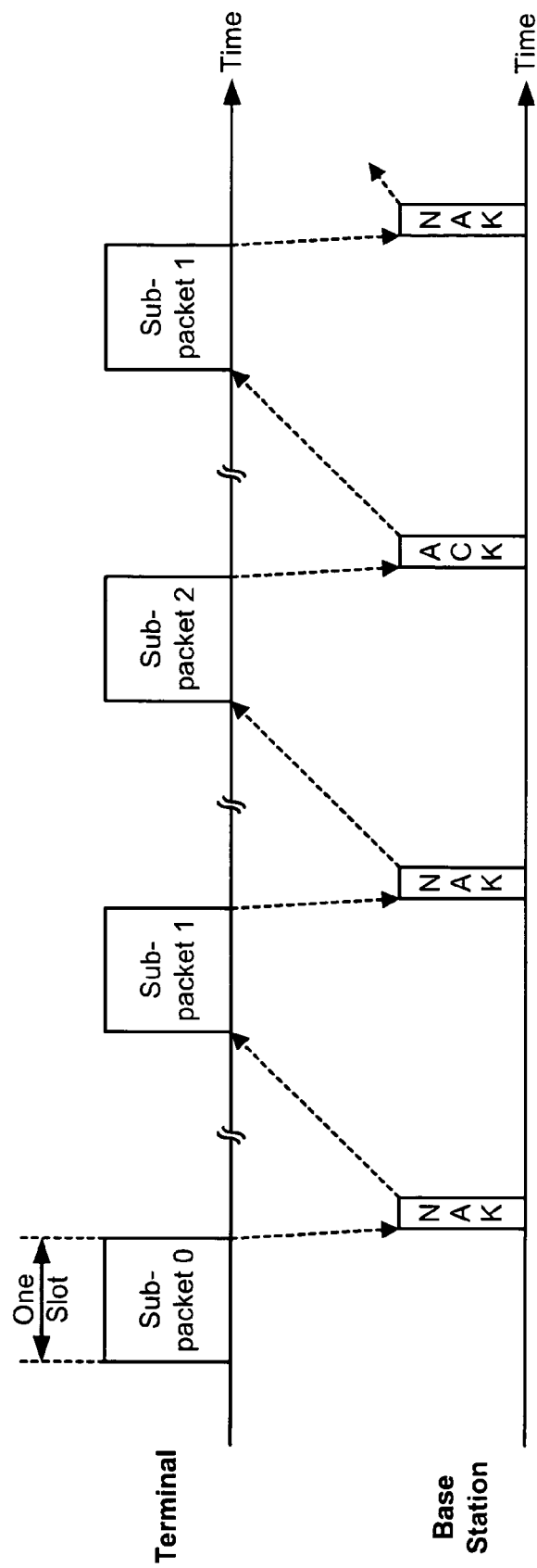
FIG. 2 shows an incremental redundancy (IR) transmission scheme.

FIG. 2 shows an incremental redundancy (IR) transmission scheme that may be used for the reverse link in system 100. If a terminal has data to send to a base station, the terminal first obtains a data rate to use for data transmission to the base station. The base station may select the data rate, e.g., based on a signal-to-noise ratio (SNR) estimate obtained by the base station for the terminal, and may send the selected data rate to the terminal. The terminal processes (e.g., encodes and modulates) a data packet at the selected data rate and partitions the coded packet into multiple subpackets. The first subpacket typically contains sufficient information to allow the base station to recover the data packet under good channel condition. Each remaining subpacket typically contains additional redundancy information for the data packet.

The terminal transmits the first subpacket on a physical channel to the base station. The base station receives the first subpacket, processes (e.g., demodulates and decodes) the subpacket, and determines whether the data packet was decoded correctly. If the packet was not decoded correctly, then the base station sends a NAK on an overhead/signaling channel to the terminal, and the terminal transmits the second subpacket upon receiving this NAK. The base station receives the second subpacket, decodes the first and second subpackets, and sends another NAK if the packet is not decoded correctly. The subpacket transmission and decoding continue in this manner until the packet is decoded correctly by the base station or all subpackets for the packet have been transmitted by the terminal.

For clarity, FIG. 2 shows transmission of both NAKs and ACKs for feedback. Many systems send only ACKs or only NAKs to reduce the amount of signaling. For an ACK-based scheme, a receiver sends an ACK only if a packet is decoded correctly and does not send any NAK. ACKs are thus explicitly sent, and NAKs are implicit sent (i.e., presumed by the absence of ACKs or indicated in some other manners). The converse is true for a NAK-based scheme. An ACK-to-NAK error occurs when an ACK is transmitted but mis-detected as a NAK. A NAK-to-ACK error occurs when a NAK is transmitted but mis-detected as an ACK. ACK-to-NAK errors are often preferred over NAK-to-ACK errors because an ACK-to-NAK error results in transmission of an additional subpacket whereas a NAK-to-ACK error results in a lost packet. For clarity, the following description assumes the use of an ACK-based scheme with explicit ACKs, unless noted otherwise.

FIG. 2 also shows the transmission time line being partitioned into slots, with each slot having a particular time duration. One subpacket may be sent on each physical channel in each slot. The base station may receive transmissions from multiple terminals simultaneously on different physical channels. The base station would then send ACK information for all of the subpackets received in each slot to the terminals that transmitted these subpackets.

System 100 may define a set of physical channels to facilitate allocation and use of the available system resources. A physical channel is a means for sending data and may also be called a channel, a traffic channel, a data channel, a code channel, a frequency channel, a subchannel, or some other terminology. Physical channels may be defined for any type of system resources such as frequency subbands, time intervals (or slots), code sequences, and/or other types of system resources. For example, system 100 may utilize orthogonal frequency division multiplexing (OFDM), which is a multi-carrier modulation technique that effectively partitions the overall system bandwidth into multiple (K) orthogonal frequency subbands. These subbands are also called tones, subcarriers, bins, frequency channels, and so on. Each subband is associated with a respective subcarrier that may be modulated with data. Multiple physical channels may be defined with the K subbands, where each physical channel may be associated with a different set of at least one subband.

System 100 may define physical channels having different transmission capacities to more efficiently assign system resources to the terminals. Physical channels with different transmission capacities may be defined in various manners, as described below.

Figure 3:
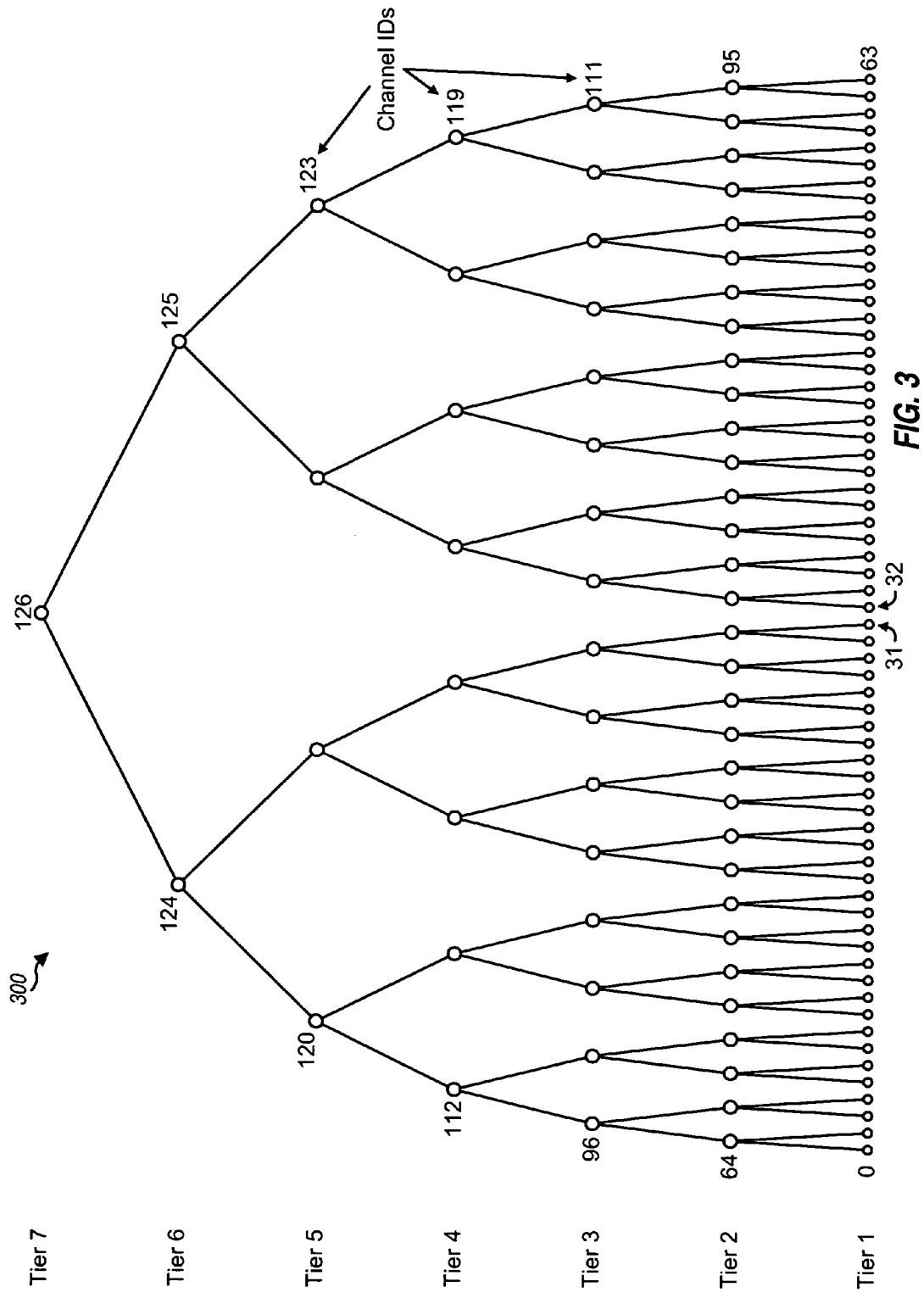
FIG. 3 shows an exemplary binary channel tree.

FIG. 3 shows an embodiment of a binary channel tree 300. For this embodiment, the available system resources are divided into 64 "ports" that are assigned port numbers of 0 through 63. A port may also be called a resource unit or some other terminology. Each port corresponds to a specific portion of the total available system resources. The 64 ports may be orthogonal to one another and may be associated with different disjoint or non-overlapping system resources such that no two ports are for the same system resource. For example, each port may correspond to a different disjoint set of subbands, and the 64 ports may cover all of the subbands available for data transmission. However, it is not necessary for the ports to be orthogonal to one another (e.g., the ports may be non orthogonal or quasi-orthogonal).

A set of physical channels is defined with the 64 ports. Each physical channel is associated with a specific set of ports and is also assigned a unique channel ID. The following physical channels are defined for binary channel tree 300:

Tier 1—64 physical channels with channel IDs of 0 through 63;

Tier 2—32 physical channels with channel IDs of 64 through 95;

Tier 3—16 physical channels with channel IDs of 96 through 111;

Tier 4—8 physical channels with channel IDs of 112 through 119;

Tier 5—4 physical channels with channel IDs of 120 through 123;

Tier 6—2 physical channels with channel IDs of 124 through 125; and

Tier 7—1 physical channel with channel ID of 126.

For the embodiment shown in FIG. 3, the physical channels are sequentially numbered from left to right for each tier, starting with channel ID of 0 at the lowest tier 1. The 64 physical channels in the lowest tier 1 have channel IDs of 0 through 63, which are the same as the port numbers 0 through 63, respectively. In general, the physical channels may be assigned channel IDs in any order and manner.

Binary channel tree 300 has a defined structure with certain characteristics. Each physical channel at each tier (except for the lowest tier 1) is composed of two physical channels in the tier immediately below. Each physical channel (except for physical channel 126 at the topmost tier 7) is also a "subset" of another physical channel, which means that the port(s) for each physical channel are a subset of the ports for another physical channel. For example, physical channel 0 is a subset of physical channel 64, which is a subset of physical channel 96, which is a subset of physical channel 112, and so on. This tree structure places certain restrictions on the use of the physical channels for an orthogonal system. In particular, for each physical channel that is assigned, all physical channels that are subsets of the assigned physical channel and all physical channels for which the assigned physical channel is a subset are "restricted". The restricted physical channels are not available for use concurrently with the assigned physical channel so that no two physical channels use the same system resource at the same time.

Each physical channel may also be considered as a node in the channel tree. For a given node x, each node that is directly or indirectly connected to node x from below is considered a descendant of node x, and each node that is directly or indirectly connected to node x from above is considered an ancestor of node x. The descendants and ancestors of node x are restricted nodes and are not used concurrently with node x. For example, physical channel 112 has descendant physical channels 0 through 7, 64 through 67, and 96 and 97 that connect to physical channel 112 from below and ancestor physical channels 120, 124 and 126 that connect to physical channel 112 from above. If physical channel 112 is used, then none of the descendant and ancestor physical channels are used concurrently with physical channel 112.

The restriction described above represents channel constraints that limit the use of the physical channels so that not all possible combinations of physical channels are allowed. The use of the physical channels is constrained because only orthogonal physical channels that do not share the same port may be used concurrently. The channel constraints may be exploit to efficiently transmit signaling for the assigned physical channels, as described below.

For binary channel tree 300 in FIG. 3, all of the physical channels in the same tier are associated with the same number of ports and hence have equal transmission capacity. The physical channels in each tier (except for the lowest tier 1) have twice the number of ports as the physical channels in the tier immediately below and hence twice the transmission capacities. A large number of physical channels with different transmission capacities are thus formed by binary channel tree 300. The physical channels may be efficiently assigned to terminals having different data requirements, channel conditions, and so on.

A base station may assign a specific group of physical channels to a group of terminals at any given moment. The terminals may have different data requirements and/or processing capabilities. Each terminal may be assigned a physical channel with the required number of ports, or as many ports as possible, based on the loading at the base station and possibly other factors. The assigned physical channels are a subset of the set of all defined physical channels. The number of assigned physical channels may be much smaller than the total number of physical channels. The ACK information for the assigned physical channels may then be compressed and represented using fewer bits. The ACK information may then be sent using less system resources, or more reliability using the same amount of system resources that is needed by a conventional scheme that sends ACKs/NAKs to individual terminals.

Various compression schemes may be used to compress the ACK information for the assigned physical channels in each slot. These compression schemes may utilize the channel constraints to reduce the number of bits to represent the ACK information. For example, once the ACK state of a particular physical channel is provided, many physical channels that cannot be used concurrently with this physical channel may be eliminated due to the channel constraints, and the eliminated/restricted physical channels do not need to be considered further in the compression. Some exemplary compression schemes are described below.

In a first compression scheme, a signaling bit is provided for each "marked" physical channel, which is a physical channel that is used to convey the ACK information for the assigned channels. The marked physical channels are often the assigned physical channels but may also be other physical channels in the channel tree. The signaling bit for each marked physical channel may be defined as follows:

Logic high ('1')—an ACK is being sent for the marked physical channel; and

Logic low ('0')—a NAK is being sent for the marked physical channel or the marked physical channel is not in use.

The first compression scheme traverses across the channel tree, starting at the top of the tree, stepping through one tier at a time, and working from left to right on each tier until either all of the assigned physical channels or all of the ports are accounted for (i.e., are "shadowed" or shaded). The operation of the first compression scheme may be more clearly explained by way of an example.

Figure 4:
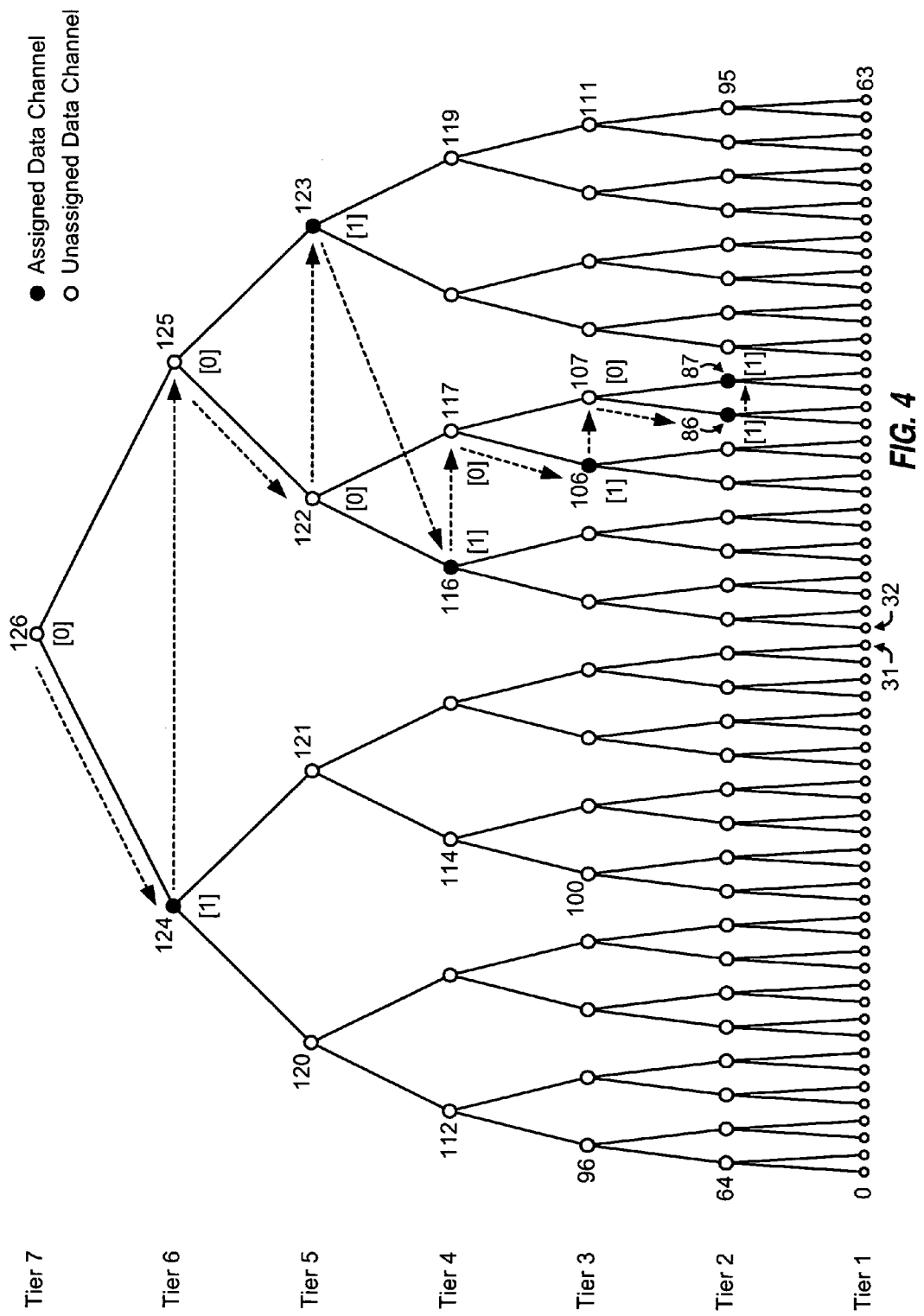
FIG. 4 shows an example with six assigned physical channels.

FIG. 4 shows an example whereby physical channels 124, 123, 116, 106, 86 and 87 in binary channel tree 300 in FIG. 3 are assigned for use and are shown with solid black circles in FIG. 4. For simplicity, the following description assumes that ACKs are being sent for all six assigned physical channels. The signaling bit for each marked physical channel is shown within square brackets in FIG. 4.

The first compression scheme provides a '0' for physical channel 126 at the topmost tier 7 of channel tree 300 to indicate that this physical channel is not in use. The compression scheme then provides a '1' for assigned physical channel 124 in the next lower tier 6 to indicate an ACK being sent for the physical channel. The use of physical channel 124 restricts the use of the 62 physical channels that are subsets/descendants of physical channel 124. These 62 restricted physical channels do not need to be considered further in the compression. The compression scheme then provides a '0' for physical channel 125, which is in the same tier as physical channel 124 just marked, to indicate that physical channel 125 is not in use. The compression scheme then provides a '0' for physical channel 122 in the next lower tier 5 to indicate that this physical channel is not in use, then a '1' for physical channel 123 to indicate an ACK being sent for this physical channel. The use of physical channel 123 restricts the use of the 30 physical channels that are subsets/descendants of physical channel 123, and these 30 physical channels do not need to be considered further in the compression.

The first compression scheme then provides a '1' for physical channel 116 in the next lower tier 4 to indicate an ACK being sent for physical channel 116, and then a '0' for physical channel 117 to indicate that this physical channel is not in use. The compression scheme then provides a '1' for physical channel 106 in the next lower tier 3 to indicate an ACK being sent for the physical channel, and then a '0' for physical channel 107 to indicate that this physical channel is not in use. The compression scheme then provides a '1' for physical channel 86 in the next lower tier 2 to indicate an ACK being sent for this physical channel, and then a '1' for physical channel 87 to indicate an ACK being sent for this physical channel. At this point, all of the 64 ports have been accounted for, and the compression scheme terminates.

The sequence of signaling bits generated by the first compression scheme for the six assigned physical channels in FIG. 4 may be given as: {'0' (126), '1' (124), '0' (125), '0' (122), '1' (123), '1' (116), '0' (117), '1' (106), '0' (107), '1' (86), and '1' (87)}. The physical channel associated with each signaling bit is shown in parenthesis next to the signaling bit. The base station only sends the sequence of signaling bits and not the associated channel IDs, i.e., the bit sequence {0, 1, 0, 0, 1, 1, 0, 1, 0, 1, 1}. This bit sequence represents an ACK message that contains the ACK information. The terminals can recover the ACK information for all of the assigned physical channels based on the signaling bit sequence, the known structure of the physical channels and their constraints, and the compression scheme used to generate the signaling bits.

For clarity, the description above assumes that ACKs are sent for all six assigned physical channels. A NAK may be sent for an assigned physical channel in various manners. For a given physical channel x that is not in the lowest tier 1, a NAK may be sent for physical channel x by providing a '0' for physical channel x and two '1s' for the two physical channels immediately below physical channel x. For example, a NAK may be sent for physical channel 124 by providing a '0' for physical channel 124, a '1' for physical channel 120, and a '1' for physical channel 121. The terminal assigned with physical channel 124 would receive the NAK for this physical channel based on the '0' sent for the physical channel. The other terminals would interpret the '1' for physical channel 120 as an ACK that shadows the channel cluster starting with physical channel 120. The '1' for physical channel 121 would likewise be interpreted as an ACK that shadows the channel cluster starting with physical channel 121. The bit sequence may then be given as: {'0' (126), '0' (124), '0' (125), '1' (120), '1' (121), '0' (122), '1' (123), '1' (116), '0' (117), '1' (106), '0' (107), '1' (86), and '1' (87)}. NAKs for the other assigned physical channels may be sent in similar manner.

For the example described above for FIG. 4, only 11 signaling bits are used to send six ACKs for the six assigned physical channels, and 13 signaling bits are used to send five ACKs and one NAK for these six assigned physical channels. Many more signaling bits may be needed to send the same ACK information to individual terminals. For example, each of the 127 physical channels in channel tree 300 may be identified by a 7-bit channel ID. The ACK information for the six assigned physical channels may then be sent using 42 bits, or 7 bits for each of the 6 assigned physical channels. The ACK information may also be mapped to specific terminals, e.g., based on Medium Access Control (MAC) IDs assigned to the terminals. In this case, the number of signaling bits is dependent on the MAC ID size. For example, if each terminal is identified by an 8-bit MAC ID, then the ACK information for the six assigned physical channels may be sent using 48 bits, or 8 bits for each of the 6 terminals assigned with physical channels. Each physical channel may also be mapped to a specific bit position for each slot on an ACK channel. In this case, 127 bit positions would be needed to individually address the 127 total physical channels, even though only six bits are sent for the six assigned physical channels in the example above.

For the example described above, all of the 64 available ports are used by the six assigned physical channels. In general, any number and any one of the available ports may be used at any given moment. Improved compression performance may be achieved by taking advantage of the unused ports and/or by combining ACKs/NAKs for multiple physical channels whenever possible, as described below.

In a first bit reduction scheme, "fictitious" or false ACKs are sent for the largest possible clusters of physical channels that are not used. For the example described above and shown in FIG. 4, if physical channel 124 is not assigned and ports 0 through 31 are not used, then a signaling bit of '1' for a fictitious ACK may be sent for physical channel 124. This single bit would then efficiently cover physical channel 124 and all of its 62 descendants physical channels, or 63 physical channels in all. The terminals would receive the '1' for physical channel 124 and assume that this physical channel is being used, and would then interpret the next signaling bit as being for physical channel 125. These terminals are not assigned any of the 63 physical channels covered by the fictitious ACK sent for physical channel 124, and would not be affected by the transmission of this fictitious ACK. The use of fictitious ACKs may substantially reduce the number of signaling bits used to represent ACK information, especially when only a small percentage of the available ports are used.

In a second bit reduction scheme, an ACK or NAK for an assigned physical channel is conveyed by sending a "proxy" ACK for the highest ancestor physical channel that covers this assigned physical channel but no other assigned physical channels. The proxy ACK may be used to convey either an implicit NAK or an implicit ACK for the assigned physical channel. As an example for a feedback scheme with implicit NAKs, if physical channel 100 is assigned to a given terminal y and no other descendant physical channels of physical channel 124 are assigned to any terminal, then a proxy ACK may be sent for physical channel 124 to convey a NAK for physical channel 100. This single signaling bit would then efficiently cover the cluster of 63 physical channels starting with physical channel 124. Since only terminal y is assigned a physical channel in this cluster, only terminal y is affected by the proxy ACK sent for physical channel 124. Terminal y would receive the proxy ACK for physical channel 124 and would recognize that this ACK is not actually sent for physical channel 124 because terminal y is assigned physical channel 100 and physical channel 124 is restricted and hence cannot be assigned concurrently. Terminal y would then interpret the proxy ACK for physical channel 124 as being sent for its assigned physical channel 100. The other terminals would receive the proxy ACK for physical channel 124 and assume that this physical channel is being used, and would then interpret the next signaling bit as being for physical channel 125. Conversely, an ACK may be sent for physical channel 100 by providing a '0' for physical channel 124, a '1' for a fictitious ACK for physical channel 120, '0s' for physical channels 121 and 114, a '1' for physical channel 100, and '1s' for fictitious ACKs for physical channels 101 and 115.

For a feedback scheme with implicit ACKs using the above example, a proxy ACK may be sent for physical channel 124 to convey an ACK for physical channel 100. This single signaling bit would cover the cluster of 63 physical channels starting with physical channel 124. However, the proxy ACK would be interpreted by terminal y assigned with physical channel 100 as being an ACK (instead of a NAK) for physical channel 100. In any case, regardless of whether the proxy ACKs are used to convey implicit NAKs or implicit ACKs, sending proxy ACKs whenever possible may substantially reduce the number of signaling bits, especially when the channel tree is sparsely used.

In a third bit reduction scheme, a "composite" ACK is sent for the largest possible collection of assigned physical channels with the same ACKs or NAKs. The composite ACK may be used to convey either an implicit NAK or an implicit ACK for these assigned physical channels. As an example for a feedback scheme with implicit NAKs, if three NAKs are to be sent for physical channels 86, 87 and 106 in FIG. 4, then a single composite ACK may be sent for physical channel 117 and used to convey the NAKs for all three physical channels 86, 87 and 106. The terminal assigned with physical channel 106 would receive the composite ACK for physical channel 117 and recognize that this ACK is not actually sent for physical channel 117 because this terminal is assigned physical channel 106 and physical channel 117 is restricted and hence cannot be assigned concurrently. This terminal would then interpret the composite ACK for physical channel 117 as being an implicit NAK for its assigned physical channel 106. The two terminals assigned with physical channels 86 and 87 would receive the composite ACK for physical channel 117 and would also interpret this ACK as being implicit NAKs for their physical channels 86 and 87 under the same reasoning. For a feedback scheme with implicit ACKs using the above example, a composite ACK may be sent for physical channel 117 to convey implicit ACKs for physical channels 86, 87 and 106. In any case, the third bit reduction scheme may be viewed as an extension of the second bit reduction scheme, which sends proxy ACK for the highest ancestor physical channel. For the above example, the terminals assigned with physical channels 86, 87 and 106 would each interpret the composite ACK sent for physical channel 117 in the same manner as if a proxy ACK was sent for physical channel 117.

In general, different types of ACKs (e.g., proxy and composite ACKs) may be sent on a given physical channel to convey implicit ACKs or implicit NAKs for one or more other physical channels. The compression is performed differently depending on whether implicit ACKs or implicit NAKs are conveyed. Implicit NAKs may be preferred since ACK-to-NAK errors are favored over NAK-to-ACK errors.

FIG. 4 shows a specific embodiment for traversing the channel tree by zig-zaging through the tree starting from the topmost tier. The channel tree may also be traversed from the top of the tree to the bottom, and from left to right. The channel tree may also be traversed based on the channel IDs, e.g., in sequential order starting with physical channel 126, then 125, then 124, then 123, and so on, and then finally 0. In general, the channel tree may be traversed in any order. Some orders may provide better compression performance than others.

In a second compression scheme, an indication bit is sent for each designated tier of the channel tree to indicate whether an ACK is being sent for any physical channel in that tier. Indication bits may be sent for all tiers of the channel tree or only certain designated tiers. For example, an indication bit may be omitted (i.e., not sent) for the topmost tier 7 in channel tree 300 since only one signaling bit is sent for this tier anyway. An indication bit may be sent or may be omitted for the next lower tier 6, and also for each of the lower tiers, depending on whether bit saving can be achieved by sending the indication bit.

A sequence of signaling bits may be generated for the ACK information to be sent for the assigned physical channels, e.g., using the first compression scheme described above. For each designated tier, the indication bit may be set to '1' if an ACK is to be sent for any physical channel in that tier and set to '0' otherwise. If the indication bit for a given tier is set to '1', then the signaling bits for the marked physical channels in that tier are sent in the normal manner, e.g., as described above for the first compression scheme. However, if the indication bit for a given tier is set to '0', then no signaling bits are sent for that tier. The operation of the second compression scheme may be more clearly explained by way of an example.

Figure 5:
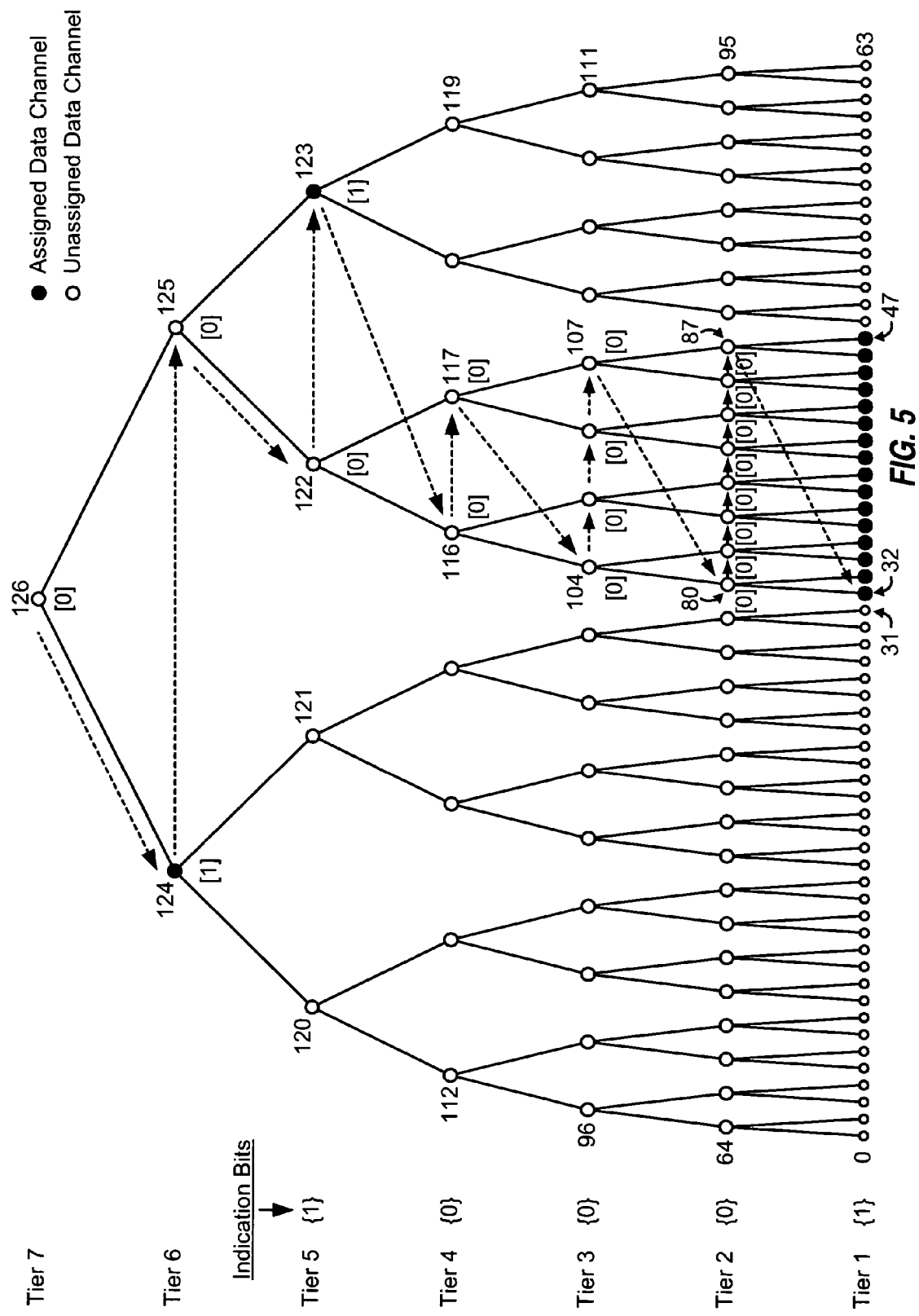
FIG. 5 shows an example with 18 assigned physical channels.

FIG. 5 shows an example whereby physical channels 124, 123, and 32 through 47 in binary channel tree 300 in FIG. 3 are assigned. These 18 assigned physical channels are shown with solid black circles in FIG. 5. For simplicity, the following description assumes that ACKs are being sent for all 18 assigned physical channels. The signaling bits for the marked physical channels in tiers 2 through 7 are shown within square brackets in FIG. 5, and the signaling bits for physical channels 32 through 47 in tier 1 are all '1 s' and not shown in FIG. 5. The sequence of signaling bits generated by the first compression scheme, without using any of the bit reduction schemes described above, may be given as: {0, 1, 0, 0, 1, 0, 0, 0, 0, 0, 0, 0, 0, 0, 0, 0, 0, 0, 0, 1, 1, 1, 1, 1, 1, 1, 1, 1, 1, 1, 1, 1, 1, 1, 1}, where the first signaling bit for each tier is underlined in the sequence.

For the example shown in FIG. 5, indication bits are sent for tiers 1 through 5 and not for tiers 6 and 7. Since no ACKs are sent for any physical channel in tiers 2, 3 and 4 in this example, the indication bit for each of these tiers is set to '0'. No signaling bits of '0s' are sent for each of tiers 2, 3 and 4 because the indication bits for these tiers are '0s'. If the indication bit for each tier is sent before the first signaling bit for that tier, then the sequence of bits generated by the second compression scheme, again without using any of the bit reduction schemes described above, may be given as: {0, 1, 0, 1, 0, 1, 0, 0, 0, 1, 1, 1, 1, 1, 1, 1, 1, 1, 1, 1, 1, 1, 1, 1, 1, 1}, where the indication bit for each tier is shown with double underline in the sequence, and the first signaling bit for each tier with signaling bits is shown with a single underline. For the example described above, the use of the indication bits reduce the number of signaling bits from 35 to 26.

The second compression scheme may also employ the bit reduction schemes described above to further reduce the number of signaling bits. The use of the indication bits may reduce the number of signaling bits to represent ACK information on average, especially if physical channels with few ports (e.g., one port) are assigned often.

In a third compression scheme, the signaling bits for the ACK information are generated based on run length coding. In one embodiment, each assigned physical channel with an ACK is marked with a '1' and all remaining physical channels are marked with '0s'. The channel tree is then traversed in a predetermined order, and a sequence of bits is formed with the marked '1s' and '0s' for all of the physical channels. For binary channel tree 300 in FIG. 3, a sequence of 127 bits is generated for the 127 physical channels. The bit sequence is provided to a run length encoder, which replaces each string of '1' and all of the following '0s' (if any) or '1s' (if any) with a specific code value. The sequence of code values for all of the bit strings in the bit sequence represents an ACK message to be sent for the ACK information. The order in which the channel tree is traversed as well as the codebook of code values and their corresponding bit strings may be selected to minimize the expected or average number of signaling bits for ACK messages. For example, the scanning order for the physical channels may be selected to maximize the likelihood of obtaining long runs of '0s', and the codebook may be defined to minimize the number of code bits used for the more likely bit strings.

For all of the compression schemes described above, the channel tree may be traversed until a termination condition is reached. In an embodiment, the termination condition is encountered when all of the assigned physical channels have been accounted for. For example, if only physical channels 124 and 123 are assigned in the example shown in FIG. 4, then two ACKs for these two physical channels may be sent with the following sequence of signaling bits: {0, 1, 0, 0, 1}, where the five bits are for physical channels 126, 124, 125, 122, and 123. If implicit ACKs are allowed, then a composite ACK may be sent for physical channel 126 to convey implicit ACKs for physical channels 123 and 125, which would further reduce the number of signaling bits. For this termination embodiment, no signaling bits are sent for the two clusters of physical channels starting with physical channels 116 and 117 since no terminals are assigned with any of these physical channels.

In another embodiment, the termination condition is encountered when all of the ports covered by the channel tree are accounted for. Whenever a physical channel is marked with a '1' for an ACK of any kind, all of the ports used by that physical channel are shadowed. When all of the ports have been shadowed, no other physical channels need to be considered and the compression scheme can terminate. An ACK message has a variable length that is determined by the specific physical channels assigned to the terminals and the specific ACKs/NAKs being sent for these assigned physical channels. By accounting for all of the ports in the compression process, a receiver can ascertain the end of the ACK message when all ports are shadowed. The length of the ACK message would then be self-determined based on the content of the message. A length field would not be needed for the ACK message, which can reduce the overall length of the message. This feature of self-determining message length is especially useful if the ACK message is combined or concatenated with other overhead messages and encoded together.

Three exemplary compression schemes have been described above to illustrate some of the ways in which ACK information may be compressed using channel constraints. In general, various compression schemes may be used to compress ACK information into ACK messages with as few bits as possible. These compression schemes take advantage of the constraints imposed on the physical channels based on the channel tree or structure to reduce the number signaling bits. The amount of compression achievable for the ACK information is dependent on various factors such the channel tree or structure, the specific physical channels that are assigned for use, the specific ACKs/NAKs being sent, the compression scheme selected for use, and so on.

The system may also support multiple compression schemes. In this case, the compression scheme that provides the best performance may be selected for each ACK message. The first compression scheme described above provides good compression performance under many scenarios but can generate a sequence of 127 signaling bits for the worst-case scenario in which physical channels 0 through 63 are assigned and have different ACKs/NAKs. The second compression scheme described above generates a sequence of 71 signaling bits for the same worst-case scenario. The third compression scheme may generate even fewer signaling bits, depending on the design of the codebook and the scanning order. For each block of ACKs/NAKs to be sent for a slot, the ACKs/NAKs may be compressed using each of the supported compression schemes, and the compression scheme that generates the fewest signaling bits may be selected for that block. The selected compression scheme may be indicated by a header field at the start of the ACK message. The size of this header field is dependent on the number of supported compression schemes, e.g., one bit for two supported compression schemes, two bits for four supported compression schemes, and so on.

A base station assigns a specific group of physical channels to a group of terminals at any given moment. This group of terminals may include "strong" terminals observing good or fair channel conditions and "weak" terminals observing poor channel conditions. In an embodiment, the ACK information for the assigned physical channels for each slot is compressed as described above to obtain a single ACK message that is transmitted to all of the terminals. For this embodiment, the ACK message is encoded at a suitable spectral efficiency or code rate and is transmitted at the proper power level such that the ACK message can be reliably decoded by all of the intended terminals.

In another embodiment, the ACK information for the assigned physical channels for each slot is segregated and sent in multiple ACK messages. For example, the ACK information for the physical channels assigned to strong terminals may be sent in one ACK message, and the ACK information for the physical channels assigned to weak terminals may be sent in another ACK message. For this embodiment, the channel tree is initially replicated so that there is one channel tree for each ACK message to be sent. Multiple "split" trees are thus formed for the multiple ACK messages. Each assigned physical channel is then mapped to one of the split trees. Compression is performed separately for each split tree to generate an ACK message for that split tree. The compression for split trees may be more clearly explained by way of an example.

Figure 6A:
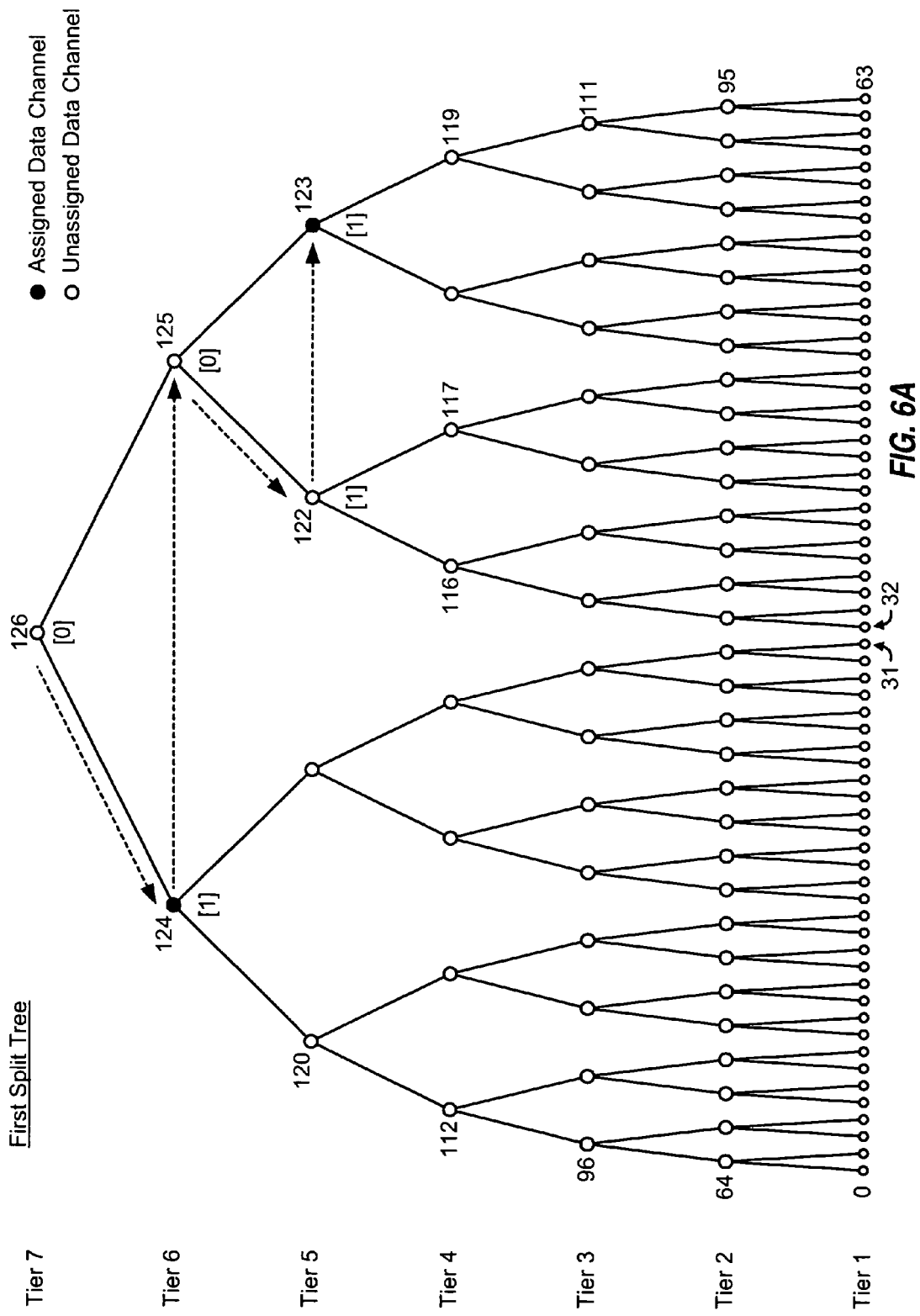
FIGS. 6A and 6B show two split trees used to generate two ACK messages for the six assigned physical channels in FIG. 4.
Figure 6B:
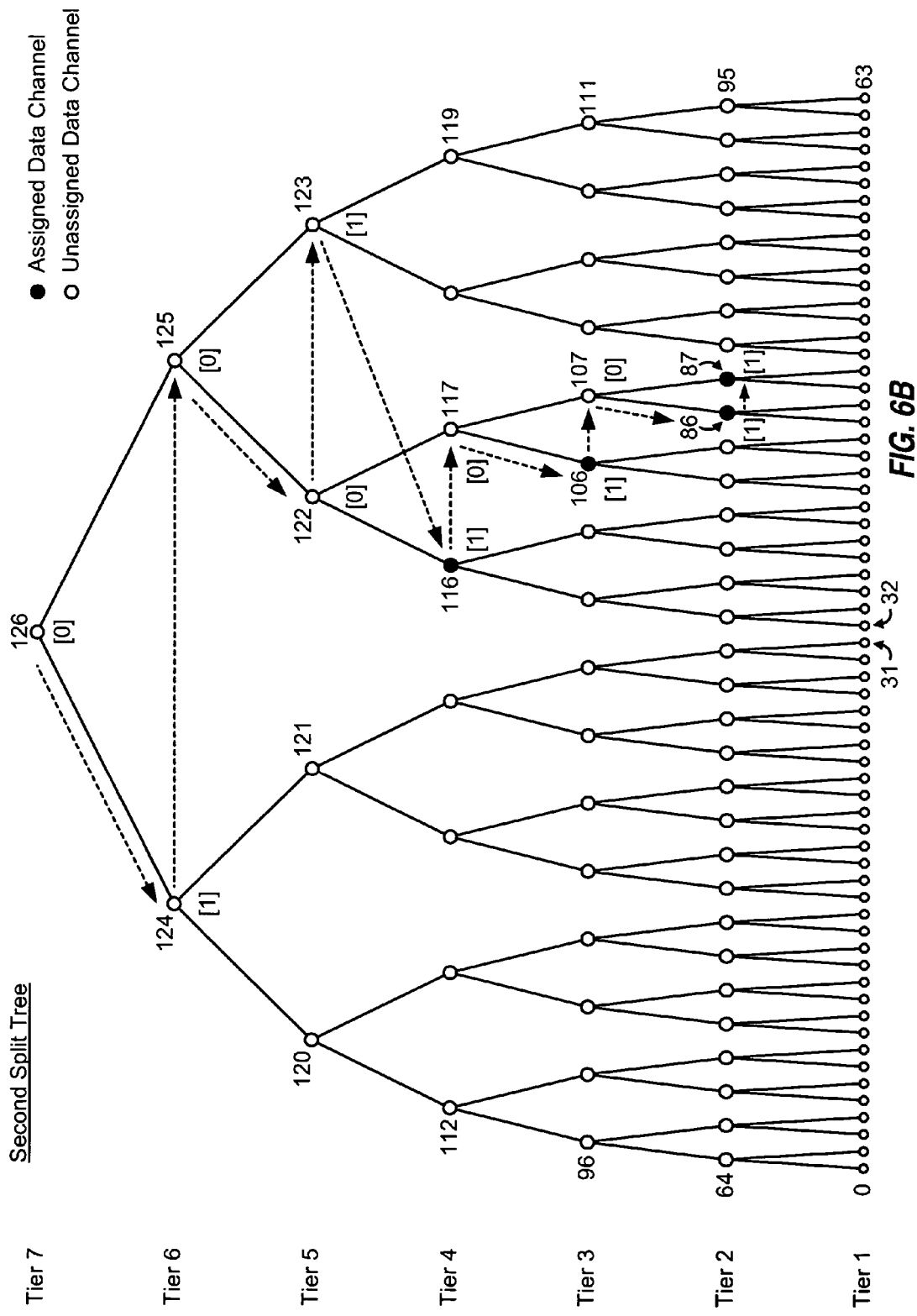

FIGS. 6A and 6B show an example whereby physical channels 124, 123, 116, 106, 86 and 87 in binary channel tree 300 in FIG. 3 are assigned for use, similar to FIG. 4. For this example, physical channels 124 and 123 are assigned to weak terminals, and the ACK information for these physical channels is sent in one ACK message. Physical channels 116, 106, 86 and 87 are assigned to strong terminals, and the ACK information for these physical channels is sent in another ACK message. For simplicity, the following description assumes that the first compression scheme is selected for use and that ACKs are being sent for the six assigned physical channels.

FIG. 6A shows the split tree for physical channels 124 and 123. The first compression scheme provides a '0' for unused physical channel 126, then a '1' for the ACK for physical channel 124, then a '0' for unused physical channel 125, then a '1' for a fictitious ACK for physical channel 122, and then a '1' for an ACK for physical channel 123. The sequence of signaling bits is then {0, 1, 0, 0, 1}. If implicit ACKs are allowed, then the compression scheme may send a '1' for a composite ACK for physical channel 126 to convey the ACKs for both physical channels 124 and 123, and the signaling bit sequence would then be simply {1}.

FIG. 6B shows the split tree for physical channels 116, 106, 86 and 87. The first compression scheme provides a '0' for unused physical channel 126, then a '1' for a fictitious ACK for physical channel 124, then a '0' for unused physical channel 125, then a '0' for unused physical channel 122, then a '1' for a fictitious ACK for physical channel 123, then a '1' for an ACK for physical channel 116, then a '0' for unused physical channel 117, then a '1' for an ACK for physical channel 106, then a '0' for unused physical channel 107, then a '1' for an ACK for physical channel 86, and then a '1' for an ACK for physical channel 87. The sequence of signaling bits is then {0, 1, 0, 0, 1, 1, 0, 1, 0, 1, 1}. If implicit ACKs are allowed, then the compression scheme may send a '1' for a composite ACK for physical channel 126 to convey the ACKs for physical channels 116, 106, 86 and 87, and the signaling bit sequence would then be simply {1}.

The above description for FIGS. 6A and 6B assumes that the ACK message for each spit tree is sent to, and decoded by, only the terminals assigned with the physical channels that are mapped to that split tree. In this case, the compression for each split tree may be performed independently without regard to the other split tree, as described above. However, if the ACK message for one split tree may be decoded by terminals assigned with physical channels mapped to another split tree, then the compression for each split tree may be performed in a manner to avoid deleterious effects due to erroneous detection of signaling bits.

For example, if fictitious ACKs are used to shadow unused physical channels and proxy and/or composite ACKs are used to convey implicit NAKs, then these ACKs may be sent only for unused physical channels to avoid erroneous ACK detection for assigned physical channels. For the example shown in FIG. 6A, a fictitious ACK is sent for physical channel 122 to shadow this physical channel and all of its descendant physical channels. If this fictitious ACK is detected by the terminal assigned with physical channel 116, 106, 86 or 87, then this terminal would erroneously presume that an implicit NAK was being sent for its assigned physical channel and would then transmit another subpacket. This redundant transmission would consume additional system resources but would not be catastrophic.

For the example shown in FIG. 6B, signaling bits of '0s' may be sent for physical channels 124 and 123, and fictitious ACKs may be sent for physical channels 120, 121, 118 and 119. Fictitious ACKs are not sent for physical channels 124 and 123 because these physical channels are assigned. If a fictitious ACK is sent for physical channel 124 and this fictitious ACK is detected by the terminal assigned with this physical channel, then this terminal would erroneously receive an ACK for its assigned physical channel and would terminate the transmission of the current packet. This unintended ACK may result in early termination of the packet transmission and may result in the packet being lost, which is highly undesirable. NAK-to-ACK errors may be avoided by restricting fictitious, proxy, and composite ACKs to only unused physical channels.

The ACK information for each split tree may be compressed independently to generate an ACK message for that split tree. The compression for each split tree may take into account the assigned physical channels for the other split tree(s) to avoid deleterious effects due to mis-detection, as described above. Nevertheless, the compression for each split tree is considered to be independent if the ACK information for the entire split tree can be recovered based on the ACK message generated for that split tree.

The ACK information for multiple split trees may also be compressed in an inter-dependent manner. For example, the ACK information for physical channels assigned to weak terminals may be compressed based on an assumption that these terminals can only decode the ACK message sent for them. The ACK information for physical channels assigned to strong terminals may be compressed based on an assumption that these terminals can also recover the ACK message sent for the weak terminals. The strong terminals can fill out their channel tree with the ACKs sent for the weak terminals and shadow out many ports. The ACK message for the strong terminals would then only need to account for the additional ACKs to be sent for these strong terminals. This dependent compression constrains the use of fictitious ACKs for the weak terminals to not shadow out ACKs for the strong terminals, but allows for incremental compression.

In general, the ACK information for the assigned physical channels may be sent in any number of ACK messages. If multiple ACK messages are sent, then the same or different compression schemes may be used for these messages. The multiple ACK messages may be encoded using the same or different coding and modulation schemes and at the same or different spectral efficiencies or code rates. The multiple ACK messages may also be transmitted at the same or different power levels. For example, the ACK message for physical channels assigned to strong terminals may be encoded and modulated at a first spectral efficiency that requires a first SNR or better for reliable detection. The ACK message for physical channels assigned to weak terminals may be encoded and modulated at a second spectral efficiency that requires a second SNR or better for reliable detection, where the second SNR is lower than the first SNR. Alternatively or additionally, the ACK message for the weak terminals may be sent with more transmit power than the ACK message for the strong terminals.

FIG. 3 shows a specific binary channel tree with 127 physical channels formed using 64 ports. Physical channels may also be formed with other channel trees or structures. Non-binary channel trees provide more flexibility for forming physical channels with different transmission capacities and/or different mapping to ports. Non-binary channel trees may be preferred for certain situations such as, for example, if the available ports do not have the same characteristics (i.e., are not equivalent), if different physical channels with different transmission capacities are desired to better match the expected usage, and so on.

Figure 7:
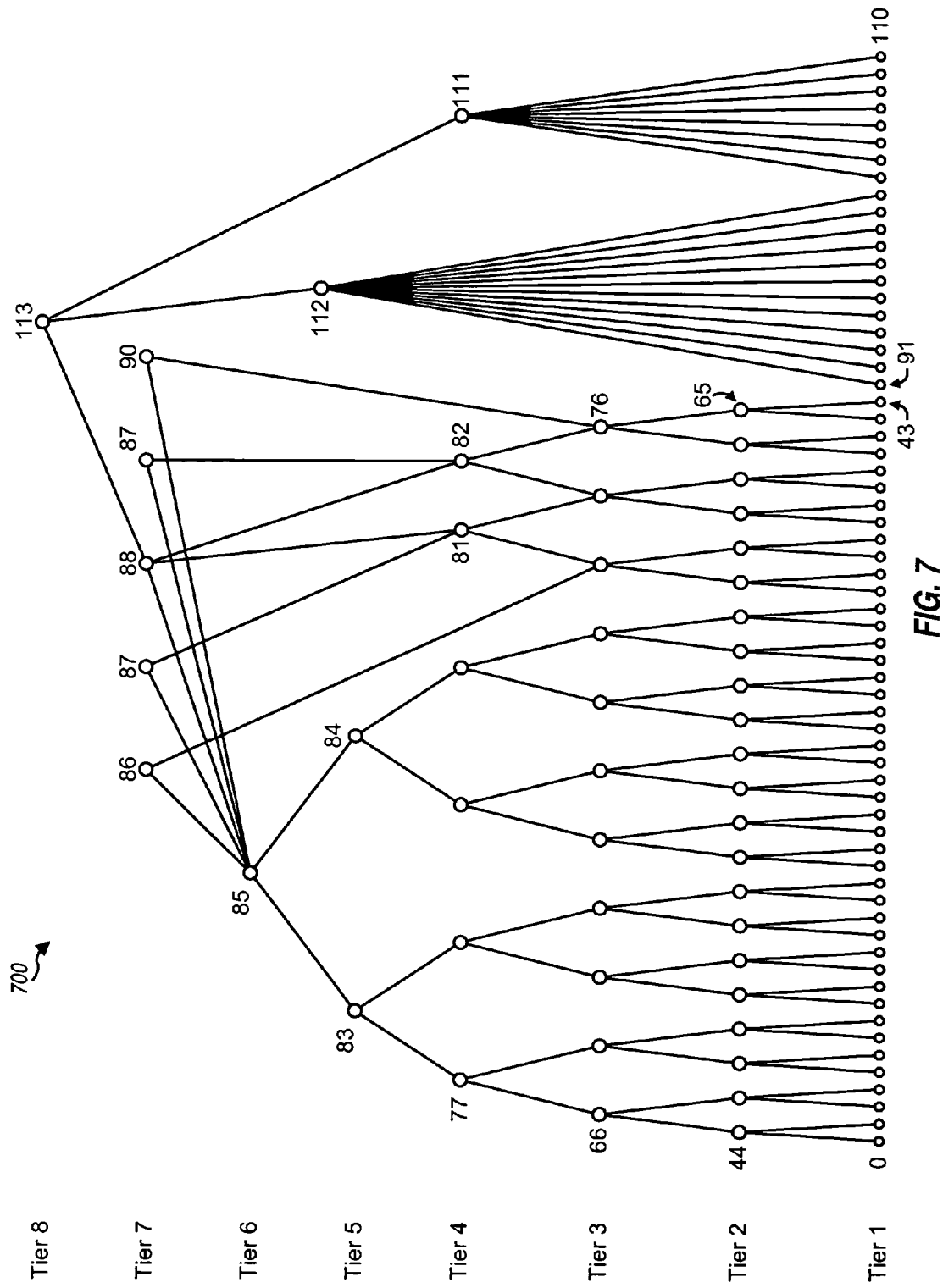
FIG. 7 shows an exemplary non-binary channel tree.

FIG. 7 shows an embodiment of a non-binary channel tree 700. For this embodiment, the available system resources are divided into 64 ports that are assigned port numbers of 0 through 63. The following physical channels are defined for channel tree 700:

Tier 1—64 physical channels with channel IDs of 0 through 43 and 91 through 110;
Tier 2—22 physical channels with channel IDs of 44 through 65;
Tier 3—11 physical channels with channel IDs of 66 through 76;
Tier 4—7 physical channels with channel IDs of 77 through 82 and 111;
Tier 5—3 physical channels with channel IDs of 83, 84 and 112;
Tier 6—1 physical channel with channel ID of 85;
Tier 7—5 physical channels with channel IDs of 86 through 90; and
Tier 8—1 physical channel with channel ID of 113.

Channel tree 700 has a structure that is defined by 114 nodes for the 114 physical channels and specific interconnections between these nodes. As shown in FIG. 7, each physical channel at each tier (except for lowest tier 1) has at least two descendant physical channels in one or more tiers below. Each physical channel (except for topmost tier 8) also has at least one ancestor physical channel in at least one tier above. A given physical channel (e.g., physical channel 81) may have multiple direct connections to multiple ancestor physical channels. In contrast, for binary channel tree 300, each physical channel has only one direct connection to one ancestor physical channel in the tier immediately above.

Each physical channel is associated with a specific set of ports. The physical channels in the same tier may be associated with different numbers of ports and hence different transmission capacities. A large number of physical channels with different transmission capacities may be formed. The distribution of physical channels may be defined to match the expected data requirements of the terminals. The physical channels may be efficiently assigned to terminals having different data requirements.

As shown in FIG. 7, the physical channels are structured so that some physical channels are subsets of other physical channels. This structure constrains the use of the physical channels so that only physical channels that do not share the same descendant physical channel (or mapped to the same port) may be used concurrently.

The available ports may have different characteristics. In FIG. 7, ports 0 through 43 for physical channels 0 through 43, respectively, may belong in a first port set, and ports 44 through 63 for physical channels 91 through 110, respectively, may belong in a second port set. The first and second port sets may be associated with different levels of interference, different maximum allowable transmit power levels, and so on. The ports in these two sets may be assigned to terminals with different channel conditions. For example, the ports in the first set may observe higher levels of interference and may be assigned to strong terminals, and the ports in the second set may observe lower levels of interference and may be assigned to weak terminals. The ports in different sets may also be associated with different mapping of ports to system resources. For example, the ports in the first set may be assigned to terminals not in soft handoff, and the ports in the second set may be assigned to terminals in soft handoff. Soft handoff is a process whereby a terminal communicates with multiple base stations simultaneously. In general, any number of port sets may be formed, and the ports in each set may have any characteristics. The physical channels may be defined in any manner with the available ports (e.g., with any mapping to ports).

FIGS. 3 and 7 show two exemplary channel trees. Various other channel trees may also be used to define the physical channels for the system.

Figure 8:
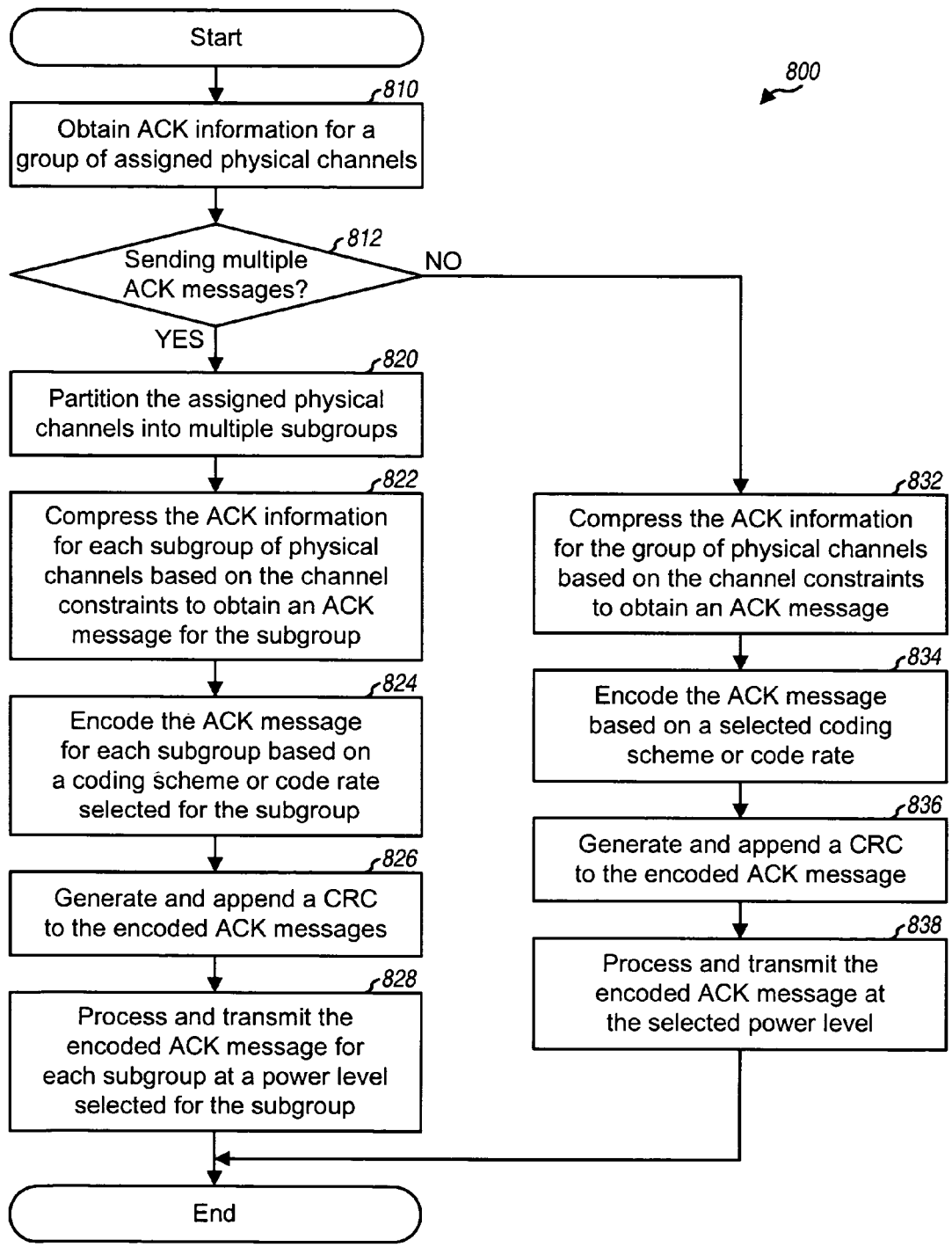
FIG. 8 shows a process to send ACK information.

FIG. 8 shows a flow diagram of a process 800 performed by a base station to send ACK information. The base station initially obtains ACK information for a group of physical channels that have been assigned for use in a slot (block 810). A determination is then made whether one or multiple ACK messages are to be sent for the slot (block 812). If multiple ACK messages are to be sent, then the assigned physical channels are partitioned into multiple subgroups, e.g., based on the channel conditions of the terminals assigned with these physical channels (block 820). The ACK information for the physical channels in each subgroup is compressed based on the channel constraints, and possibly on knowledge of the other assigned physical channels, to obtain an ACK message for the subgroup (block 822). The ACK message for each subgroup is encoded based on a spectral efficiency, coding scheme, or code rate selected for that subgroup (block 824). A CRC is generated and appended to the encoded ACK messages for the slot (block 826). The encoded ACK message for each subgroup is further processed (e.g., modulated) and transmitted at a power level selected for the subgroup (block 828).

If only one ACK message is to be sent for the slot, as determined in block 812, then the ACK information for all of the assigned physical channels is compressed based on the channel constraints to obtain one ACK message (block 832). The ACK message is then encoded (block 834), appended with a CRC (block 836), and processed and transmitted at a power level selected for the message (block 838).

Figure 9:
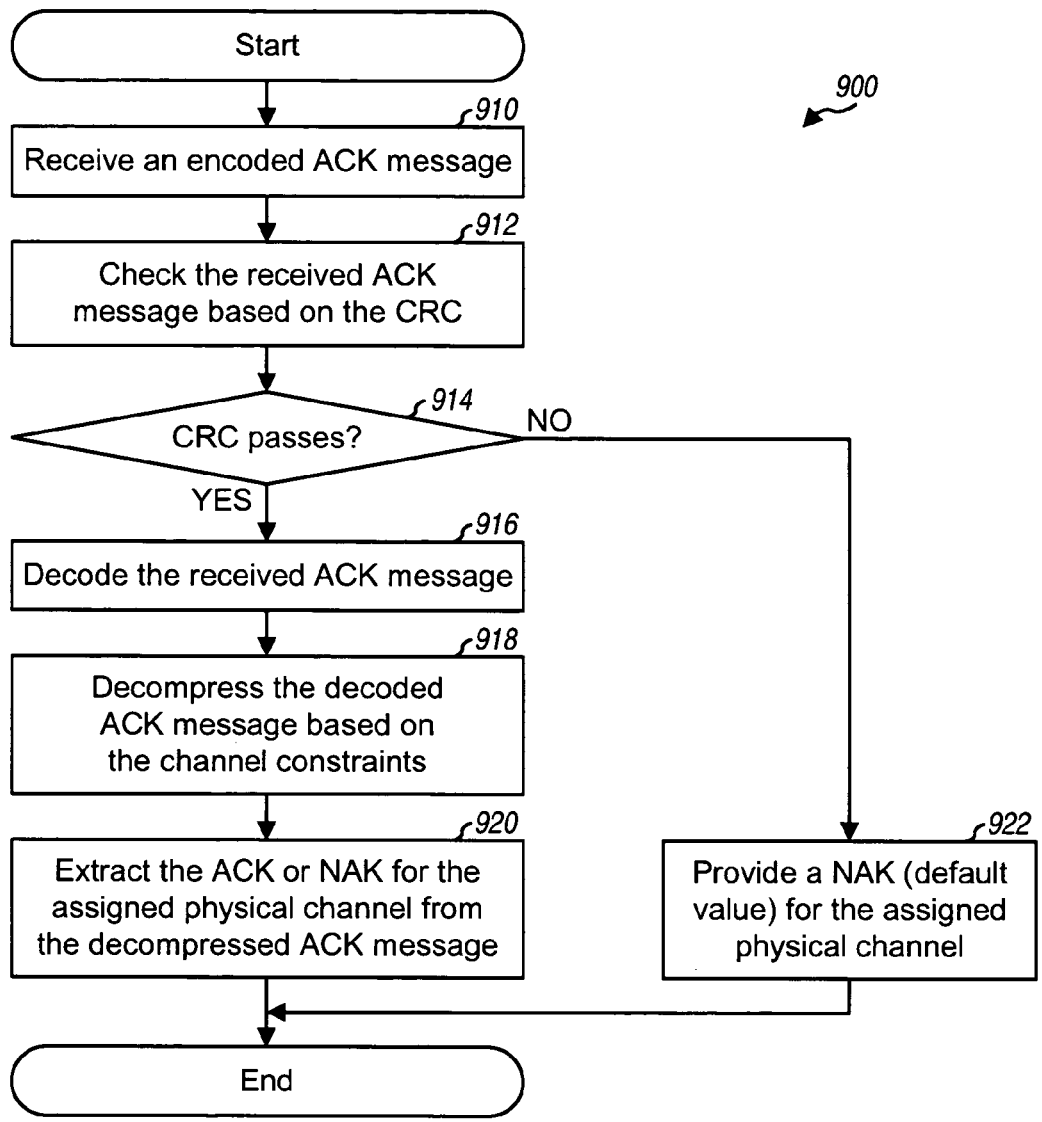
FIG. 9 shows a process to receive ACK information.

FIG. 9 shows a flow diagram of a process 900 performed by a terminal to receive ACK information. The terminal receives an encoded ACK message containing the ACK or NAK for its assigned physical channel (block 910). The terminal checks the received ACK message based on the CRC appended with the message (block 912) and determines whether the CRC passes (block 914). If the CRC fails, then the terminal provides a NAK (which is a default value) for its assigned physical channel (block 922). Otherwise, if the CRC passes, the terminal decodes the received ACK message (block 916), decompresses the decoded ACK message based on the channel constraints (block 918), and extracts the ACK or NAK for its assigned physical channel from the decompressed ACK message (block 920).

Figure 10:
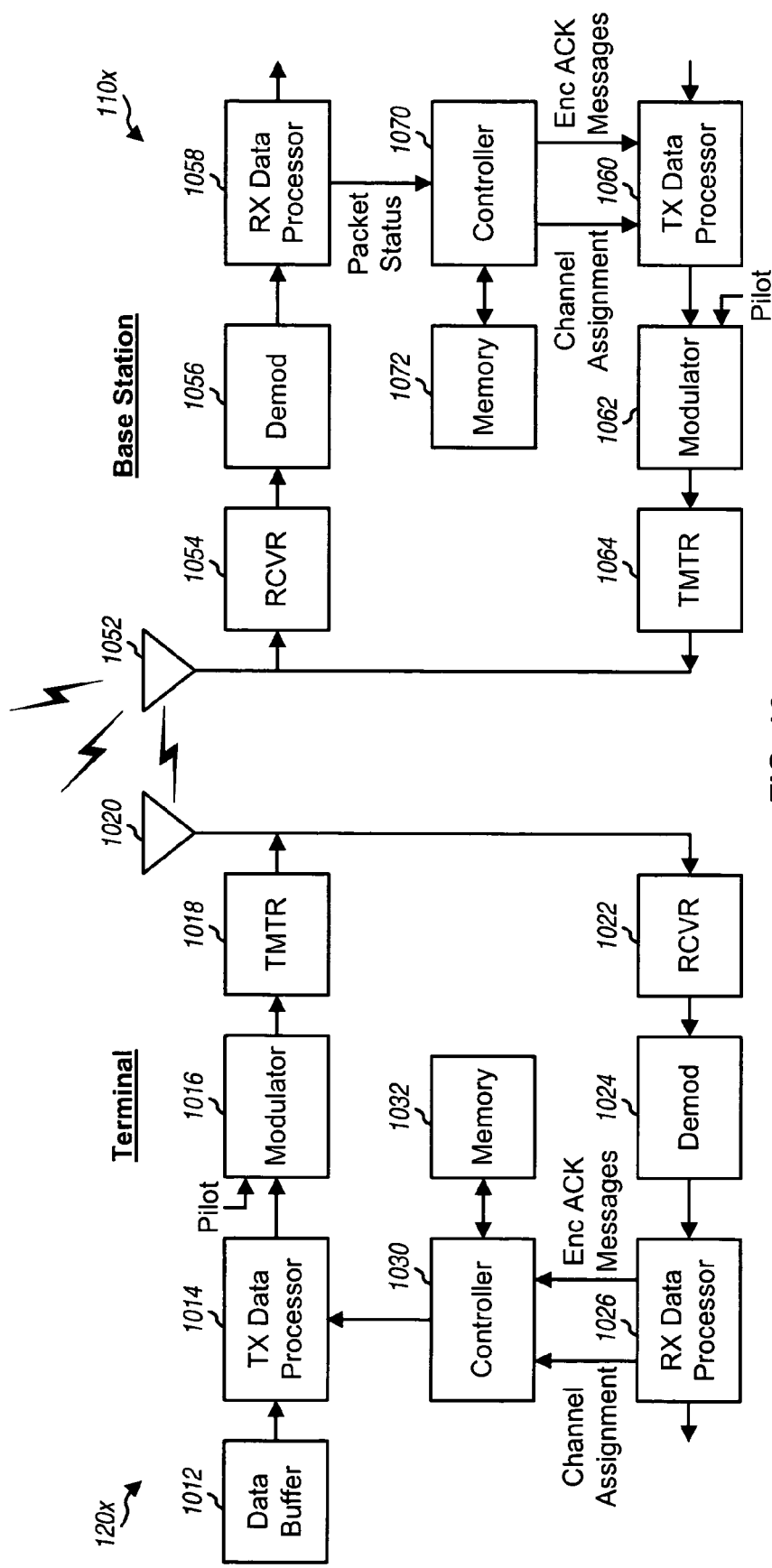
FIG. 10 shows a block diagram of a base station and a terminal.

FIG. 10 shows a block diagram of a base station 110x and a terminal 120x, which are one of the base stations and one of the terminals, respectively, in FIG. 1. For the reverse link, at terminal 120x, a transmit (TX) data processor 1014 receives traffic data from a data buffer 1012, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 1016 receives the data symbols, pilot symbols, and possibly signaling for the reverse link, performs OFDM modulation and/or other processing as specified by the system, and provides a stream of output chips. A transmitter unit (TMTR) 1018 processes (e.g., converts to analog, filters, amplifies, and frequency upconverts) the output chip stream and generates a modulated signal, which is transmitted from an antenna 1020.

At base station 110x, the modulated signals transmitted by terminal 120x and other terminals in communication with base station 110x are received by an antenna 1052. A receiver unit (RCVR) 1054 processes (e.g., conditions and digitizes) the received signal from antenna 1052 and provides received samples. A demodulator (Demod) 1056 processes (e.g., demodulates and detects) the received samples and provides detected data symbols, which are noisy estimate of the data symbols transmitted by the terminals to base station 110x. A receive (RX) data processor 1058 processes (e.g., symbol demaps, deinterleaves, and decodes) the detected data symbols for each terminal and provides decoded data for that terminal.

For the forward link, at base station 110x, traffic data is processed by a TX data processor 1060 to generate data symbols. A modulator 1062 receives the data symbols, pilot symbols, and signaling for the forward link, performs OFDM modulation and/or other pertinent processing, and provides an output chip stream, which is further conditioned by a transmitter unit 1064 and transmitted from antenna 1052. The forward link signaling may include encoded (Enc) ACK messages generated by a controller 1070 for all terminals transmitting on the reverse link to base station 110x. At terminal 120x, the modulated signal transmitted by base station 110x is received by antenna 1020, conditioned and digitized by a receiver unit 1022, and processed by a demodulator 1024 to obtain detected data symbols. An RX data processor 1026 processes the detected data symbols and provides decoded data for the terminal and the forward link signaling. Controller 1030 receives the encoded ACK messages, extracts the ACKs/NAKs for terminal 120x, and controls data transmission on the reverse link to base station 110x.

Controllers 1030 and 1070 direct the operation of terminal 120x and base station 110x, respectively. Memory units 1032 and 1072 store program codes and data used by controllers 1030 and 1070, respectively.

Figure 11:
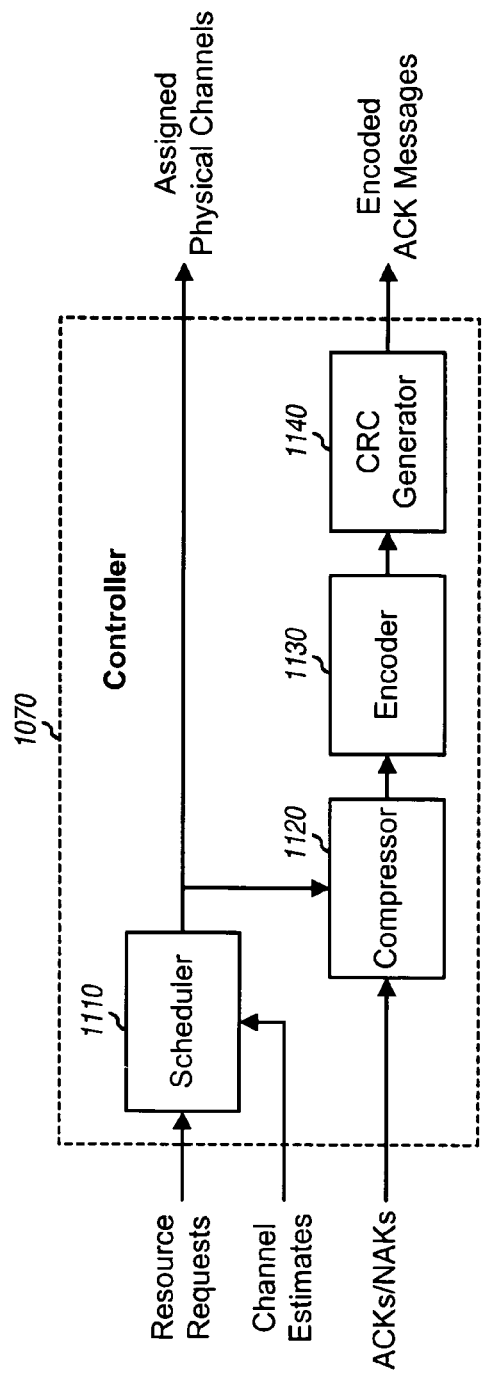
FIG. 11 shows a controller for compressing and encoding ACK information.

FIG. 11 shows a block diagram of an embodiment of controller 1070 at base station 110x. Within controller 1070, a scheduler 1110 receives resource requests sent by terminals for data transmission on the forward and/or reverse links. Scheduler 1110 processes the resource requests based on various factors such as the channel conditions for the terminals, their priority, the amount of system resources requested, and so on. Scheduler 1110 selects all or a subset of the requesting terminals for data transmission and assigns a suitable physical channel to each selected terminal. The assigned physical channels are sent to the selected terminals via over-the-air signaling, e.g., channel assignment messages.

A compressor 1120 receives ACK information for all physical channels that have been assigned, compresses the ACK information for each slot based on a selected compression scheme, and provides one or more ACK messages for the slot. An encoder 1130 encodes the ACK messages and provides encoded ACK messages. Encoder 1130 may utilize a convolutional code, a block code, and/or some other type of error correction code. In general, encoder 1130 may encode each ACK message separately, or all ACK messages for each slot together, or all ACK messages and other signaling for each slot together, and so on. A CRC generator 1140 generates a CRC value for the encoded ACK message(s) for each slot and appends the CRC value to the encoded ACK message (s). CRC generator 1140 may also utilize some other error detection code.

Figure 12:
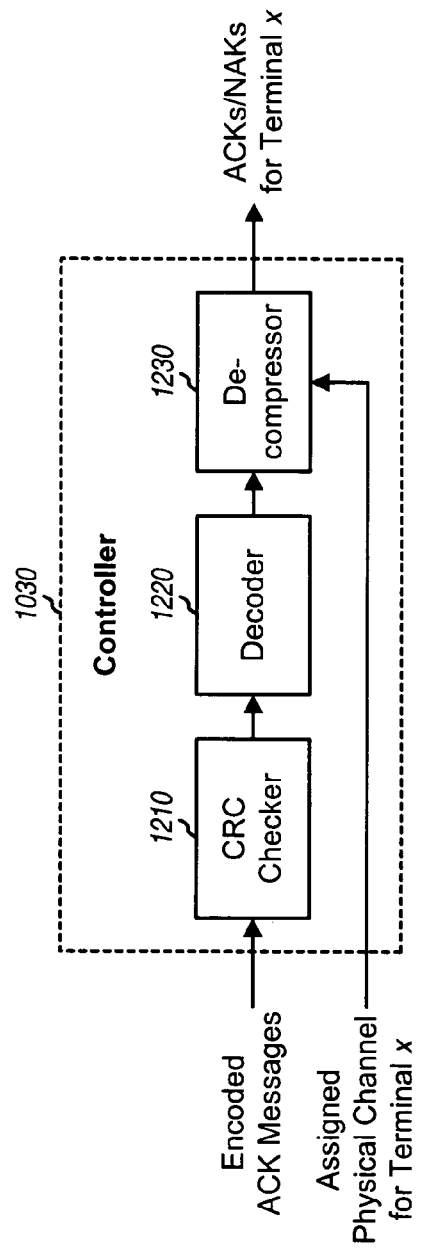
FIG. 12 shows a controller for decoding and decompressing ACK information.

FIG. 12 shows a block diagram of an embodiment of controller 1030 at terminal 120x. Within controller 1030, a CRC checker 1210 receives the encoded ACK message(s) for each slot and determines whether the encoded ACK message(s) are in error based on the appended CRC value. If the CRC fails, then controller 1030 presumes that a NAK was sent for the slot. If the CRC passes, then a decoder 1220 decodes the encoded ACK message containing the ACK information for the physical channel assigned to terminal 120x to obtain a decoded ACK message. A decompressor 1230 decompresses the decoded ACK message based on the channel constraints and the compression scheme used to generate the ACK message and extracts the ACK or NAK sent for the assigned physical channel. Controller 1030 uses the extracted ACK or NAK to control the data transmission to base station 110x.

For clarity, much of the description above is for an ACK-based scheme where ACKs are explicitly sent and NAKs may be implicitly sent. The techniques described herein may also be used for a NAK-based scheme where NAKs are explicitly sent and ACKs may be implicitly sent.

For clarity, the signaling transmission techniques have also been described above for sending ACKs information. These techniques may also be used to send other types of signaling such as, for example, power control (PC) bits/commands, SNR measurements, data rate control, requests for certain information (e.g., SNR), and so on. In general, the techniques may be used for any signaling that is mapped to channels, where the channels have some usage constraints that can be exploit to compress the signaling. The signaling may comprise one bit for each channel (e.g., an ACK/NAK or a power control command) or multiple bits for each channel.

The transmission of signaling (e.g., ACK information) for a group of physical channels using multicast transmission can provide certain advantages. The messages for the signaling may be encoded with error correction and/or error detection coding to improve reliability. This encoding is often not feasible for independently transmitted signaling because of the encoding overhead.

The signaling transmission techniques described herein may be implemented by various means. For example, these techniques may be implemented in hardware, software, or a combination thereof. For a hardware implementation, the processing units used to process (e.g., compress and encode) signaling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to decode and decompress the signaling may also be implemented with one or more ASICs, DSPs, and so on.

For a software implementation, the signaling transmission techniques may be implemented with modules (e.g., procedures, functions, and so on) that perform the functions described herein. The software codes may be stored in a memory unit (e.g., memory unit 1032 or 1072 in FIG. 10) and executed by a processor (e.g., controller 1030 or 1070). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting signaling in a communication system, comprising:
obtaining, by a processor, signaling for a group of channels used for multicast data transmission and selected from among a plurality Of channels having exclusive use constraints on usage;
compressing, by the processor, the signaling for the group of channels based on the exclusive use constraints to obtain at least one message; and
processing the at least one message for transmission via a communication link.

2. The method of claim 1, wherein the compressing the signaling comprises providing a fictitious signaling value for a cluster of channels not used for data transmission.

3. The method of claim 1, wherein the compressing the signaling comprises providing a first signaling value for a first channel to convey a second signaling value for at least one channel that is a subset of the lest channel.

4. The method of claim 1, wherein the compressing the signaling comprises traversing a channel tree for the plurality of channels in a predetermined order, and marking each channel in the channel tree with, a signaling value until a termination condition is reached.

5. The method of claim 1, wherein the compressing the signaling comprises compressing the signaling for the group of channels using run length coding.

6. The method of claim 1, wherein the compressing the signaling comprises:
partitioning the group of channels into at least two subgroups, and
compressing the signaling for the channels in each subgroup based on the respective exclusive use constraints to obtain a message for the subgroup.

7. The method of claim 1, wherein the compressing the signaling comprises
partitioning the group of channels into at least two subgroups, and
independently compressing the signaling for the channels in each subgroup based on the exclusive use constraints to obtain a message for the respective subgroup.

8. The method of claim 1, wherein the compressing the signaling comprises
partitioning the group of channels into first and second subgroups,
compressing the Signaling for the channels in the first subgroup based on the first subgroup exclusive use constraints, and compressing the signaling for the channels in the second subgroup based on the second subgroup exclusive use constraints and the signaling for the channels in the first subgroup.

9. The method of claim 1, wherein the processing the at least one message comprises:
encoding the at least one message, and
generating an error detection code value for the at least one message.

10. An apparatus in a communication system, comprising:
a compressor configured to obtain signaling for a group of channels used for multicast data transmission and selected from among a plurality of channels having exclusive use constraints on usage, and to compress the signaling for the group of channels based on the exclusive use constraints to obtain at least one message; and
an encoder configured to process the at least one message for transmission via a communication link.

11. The apparatus of claim 10, wherein the signaling is for acknowledgments (ACKs), negative acknowledgments (NAKs), or both ACKs and NAKs.

12. The apparatus of claim 10, wherein the signaling is for power control commands.

13. The apparatus of claim 10, wherein the compressor is configured to provide a fictitious signaling value for a cluster of channels not used for data transmission.

14. The apparatus of claim 10, wherein the compressor is configured to provide a first signaling value for a first channel to convey a second signaling value for at least one channel that is a subset of the first channel.

15. The apparatus of claim 10, wherein the compressor is configured to partition the group of channels into at least two subgroups and to compress the signaling for the channels in each subgroup based on the exclusive use constraints to obtain a message for the subgroup.

16. The apparatus of claim 15, wherein the at least two subgroups of channels are assigned to at least two subgroups of terminals having different channel conditions.

17. The apparatus of claim 15, wherein the at least two subgroups of channels have different interference levels, different transmit power limits, or both different interference levels and different transmit power limits.

18. The apparatus of claim 10, wherein the encoder is configured to encode the at least one message and to generate an error detection code value for the at least one message.

19. The apparatus of claim 10, wherein the plurality of channels are defined by a channel tree.

20. The apparatus of claim 19, wherein the exclusive use constraints for the plurality of channels are such that use of a particular channel restricts use of other channels that are descendants or ancestors of the particular channel in the channel tree.

21. The apparatus of claim 19, wherein each of the plurality of channels, except for channels at a topmost tier of the channel tree, is a subset of at least one other channel.

22. The apparatus of claim 10, wherein the plurality of channels is defined by a binary channel tree.

23. The apparatus of claim 10, wherein the plurality of channels is defined by a non-binary channel tree.

24. The apparatus of claim 10, wherein the group of channels is assigned to a group of terminals for data transmission.

25. The apparatus of claim 10, wherein the plurality of channels are defined for a plurality of frequency subbands available for data transmission.

26. The apparatus of claim 10, wherein the plurality of channels are defined for a plurality of time slots available for data transmission.

27. The apparatus of claim 10, wherein the plurality of channels are defined for a plurality of orthogonal code sequences usable for data transmission.

28. The apparatus of claim 10, wherein each of the at least one message has a variable length that is determinable based on content of the message.

29. An apparatus in a wireless communication system, comprising:
means for obtaining signaling for a group of channels used for multicast data transmission and selected from among a plurality of channels having exclusive use constraints on usage;
means for compressing the signaling for the group of channels based on the exclusive use constraints to obtain at least one message;
means for processing the at least one message for transmission via a communication link; and
means for storing the at least one message.

30. The apparatus of claim 29, wherein the means for compressing the signaling comprises:
means for providing a fictitious signaling value for a cluster of channels not used for data transmission.

31. The apparatus of claim 29, wherein the means for compressing the signaling comprises:
means for providing a first signaling value for a first channel to convey a second signaling value for at least one channel that is a subset of the first channel.

32. The apparatus of claim 29, wherein the means for compressing the signaling comprises:
means for partitioning the group of channels into at least two subgroups, and
means for compressing the signaling for the channels in each subgroup based on the exclusive use constraints to obtain a message for the subgroup.

33. The apparatus of claim 29, wherein the means for processing the at least one message comprises:
means for encoding the at least one message, and
means for generating an error detection code for the at least one message.

34. A method of sending acknowledgment (ACK) in a communication system, comprising:
obtaining, by a processor, ACK information for a group of channels used for multicast data transmission and selected from among a plurality of channels having exclusive use constraints on usage;
compressing, by the processor, the ACK information for the group of channels based on the exclusive use constraints to obtain at least one message; and
processing the at least one message for transmission via a communication link.

35. The method of claim 34, wherein the compressing the ACK information for the group of channels comprises providing a first signaling value for each channel for which an ACK is to be sent.

36. The method of claim 35, wherein the compressing the ACK information from the group of channels further comprises:
providing a second signaling value for each of at least one channel for which and ACK is not to be sent.

37. The method of claim 34, wherein the compressing the ACK information for the group of channels comprises:
providing a fictitious signaling value for a cluster of channels not used for data transmission.

38. The method of claim 34, wherein the compressing the ACK information for the group of channels comprises:

providing a first signaling value for a first channel to convey a negative acknowledgment (NAK) for at least one channel that is a subset of the first channel.

39. The method of claim 34, wherein the compressing the ACK information for the group of channels comprises:
providing a first signaling value for a first channel to convey an ACK for at least one channel that is a subset of the first channel.

40. The method of claim 34, wherein the processing the at least one message comprises:
encoding the at least one message, and
generating an error detection code for the at least one message.

41. The method of claim 34, wherein the compressing the ACK information for the group of channels comprises:
partitioning the group of channels into at least two subgroups, and
compressing the ACK information for the channels in each subgroup based on the exclusive use constraints to obtain a message for the respective subgroup.

42. The method of claim 41, wherein the processing the at least one message comprises:
encoding the message for each subgroup of channels based on a code rate selected for the respective subgroup.

43. The method of claim 41, further comprising:
transmitting the message for each subgroup of channels at a power level selected for the respective subgroup.

44. A method of receiving signaling in a communication system, comprising:
obtaining, by a processor, a message containing signaling for a group of channels used for multicast data transmission and selected from among a plurality of channels having exclusive use constraints on usage;
decompressing, by the processor, the message based on the exclusive use constraints to obtain a decompressed message; and
obtaining from the decompressed message signaling sent for a selected channel in the group of channels.

45. The method of claim 44, further comprising:
performing error detection on the message to determine whether the message is in error, and wherein the decompression is performed if the message is not in error.

46. The method of claim 45, further comprising: providing a default value for the signaling for the selected channel if the message is in error.

47. The method of claim 44, further comprising:
decoding the message to obtain a decoded message, and wherein the decompression is performed on the decoded message.

48. An apparatus in a communication system, comprising:
a decompressor configured to obtain a message containing signaling for a group of channels used for multicast data transmission and selected from among a plurality of channels having exclusive use constraints on usage, to decompress the message based on the exclusive use constraints to obtain a decompressed message, and to obtain from the decompressed message signaling sent for a selected channel in the group of channels.

49. The apparatus of claim 48, wherein the signaling is for acknowledgments (ACKs), negative acknowledgments (NAKs), or both ACKs and NAKs.

50. The apparatus of claim 48, further comprising:
a checker configured to perform error detection on the message to determine whether the message is in error, and wherein the decompressor is configured to decompress the message if not in error.

51. The apparatus of claim 48, further comprising:
a decoder configured to decode the message to obtain a decoded message, and wherein the decompressor is configured to decompress the decoded message.

52. The apparatus of claim 48, wherein the plurality of channels are defined for a plurality of frequency subbands available for data transmission.

53. An apparatus in a wireless communication system, comprising:
means for obtaining a message containing signaling for a group of channels used for multicast data transmission and selected from among a plurality of channels having exclusive use constraints on usage;
means for decompressing the message based on the exclusive use constraints to obtain a decompressed message;
means for obtaining from the decompressed message signaling sent for a selected channel in the group of channels; and
means for storing one or more of the message or the decompressed message.

54. The apparatus of claim 53, further comprising:
means for performing error detection on the message to determine whether the message is in error, and wherein the message is decompressed if not in error.

55. The apparatus of claim 53, further comprising:
means for decoding the message to obtain a decoded message, and wherein the decoded message is decompressed.

56. A memory unit external to a processor including program code stored thereon for executing the instructions comprising:
obtaining a message containing signaling for a group of channels used for multicast data transmission and selected from among a plurality of channels having exclusive use constraints on usage;
decompressing the message based on the exclusive use constraints to obtain a decompressed message; and
obtaining from the decompressed message signaling sent for a selected channel in the group of channels.

57. A memory unit external to a processor including program code stored thereon for executing the instructions comprising:
obtaining signaling for a group of channels used for multicast data transmission and selected from among a plurality of channels having exclusive use constraints on usage;
compressing the signaling for the group of channels based on the exclusive use constraints to obtain at least one message; and
processing the at least one message for transmission via a communication link.

* * * * *

UNITED STATES PATENT AND TRADEMARK OFFICE
CERTIFICATE OF CORRECTION

PATENT NO. : 7,636,328 B2  
APPLICATION NO. : 10/969117  
DATED : December 22, 2009  
INVENTOR(S) : Teague et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this

Twenty-first Day of December, 2010

David J. Kappos  
*Director of the United States Patent and Trademark Office*